(12) United States Patent
Chiang et al.

(10) Patent No.: US 10,725,875 B2
(45) Date of Patent: Jul. 28, 2020

(54) SERVER SYSTEM, SERVER DEVICE AND POWER SUPPLY RECOVERY METHOD THEREFOR

(71) Applicant: Wistron Corporation, New Taipei (TW)

(72) Inventors: Wei-Yu Chiang, New Taipei (TW); Kui-Yeh Chen, New Taipei (TW); Yi-Chen Luo, New Taipei (TW); Chih-Yuan Hsu, New Taipei (TW); Chung-Chin Li, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 252 days.

(21) Appl. No.: 15/709,478

(22) Filed: Sep. 20, 2017

(65) Prior Publication Data
US 2018/0341563 A1 Nov. 29, 2018

(30) Foreign Application Priority Data
May 23, 2017 (TW) .............................. 106116993 A

(51) Int. Cl.
| | |
|---|---|
| *G09F 11/00* | (2006.01) |
| *G06F 11/20* | (2006.01) |
| *G06F 1/28* | (2006.01) |
| *G06F 1/30* | (2006.01) |
| *G06F 1/26* | (2006.01) |
| *G06F 11/30* | (2006.01) |

(52) U.S. Cl.
CPC .......... *G06F 11/2015* (2013.01); *G06F 1/263* (2013.01); *G06F 1/28* (2013.01); *G06F 1/30* (2013.01); *G06F 11/3006* (2013.01); *G06F 11/3062* (2013.01); *G06F 2201/805* (2013.01)

(58) Field of Classification Search
CPC ... G06F 1/263; G06F 1/28; G06F 1/30; G06F 11/2015; G06F 11/3006; G06F 11/3062
See application file for complete search history.

(56) References Cited

U.S. PATENT DOCUMENTS

| | | | | |
|---|---|---|---|---|
| 8,723,362 | B2 * | 5/2014 | Park | G06F 1/30 307/64 |
| 9,164,557 | B1 * | 10/2015 | Marr | G06F 1/28 |
| 10,082,856 | B1 * | 9/2018 | Owen | G06F 1/263 |
| 10,348,123 | B2 * | 7/2019 | Nguyen | H02J 9/06 |

(Continued)

FOREIGN PATENT DOCUMENTS

| | | |
|---|---|---|
| TW | 201223077 A1 | 6/2012 |
| TW | 201531840 A | 8/2015 |

*Primary Examiner* — Marc Duncan
(74) *Attorney, Agent, or Firm* — Winston Hsu

(57) ABSTRACT

A server system, a server device, and a power supply recovery method therefor are provided. The server system includes a plurality of servers and a power controller. Each of the servers includes an AC power supply and a DC power supply. The DC power supplies of the servers are mutually connected through a cable. The power controller communicates with the servers. When a specific server detects that the AC power supply belonging thereto does not operate normally, the power controller informs other servers of a power required by the specific server, and the specific server controls the DC power supply belonging thereto to obtain powers provided from other servers through the cable, so as to maintain the operation of the specific server.

8 Claims, 3 Drawing Sheets

(56) References Cited

U.S. PATENT DOCUMENTS

| | | | |
|---|---|---|---|
| 2003/0135773 A1* | 7/2003 | Zhang | G06F 1/28 713/340 |
| 2015/0116913 A1* | 4/2015 | Kwon | H05K 7/1492 361/624 |
| 2016/0274638 A1* | 9/2016 | Kwon | G06F 1/28 |

* cited by examiner

SERVER SYSTEM, SERVER DEVICE AND POWER SUPPLY RECOVERY METHOD THEREFOR

CROSS-REFERENCE TO RELATED APPLICATION

This application claims the priority benefit of Taiwan application serial no. 106116993, filed on May 23, 2017. The entirety of the above-mentioned patent application is hereby incorporated by reference herein and made a part of this specification.

BACKGROUND

Field of the Invention

The invention is directed to a power supply technique of a computer equipment and more particularly, to a server system, a server device and a power recovery method therefor, in which direct-current (DC) power supplies disposed in each server are mutually connected.

Description of Related Art

Both data transmission and access are performed with a large number of hardware devices (e.g., servers or network switches), thereby achieving implementation and application of big data. In order to prevent the failure in the operation of currently available servers or network switches due to sudden damage of alternating-current (AC) power supplies thereof, each single server or network switch is designed with two AC power supplies for backing up each other.

However, the presence of the two AC power supplies does not distribute to increasing AC-to-DC conversion efficiency for each server or network switch, but needlessly results in increase of power consumption and weight of server devices in a scenario that both the two AC power supplies are in normal operation. In addition, the weight, volume and cost of an AC power supply are much greater than those of a DC power supply due to its circuit complicity and equipment volume. Thus, how to improve the power conversion efficiency in each server or network switch, or maintain mutual power supply recovery function while the weight of the servers is reduced is a major subject of the current power supply technique of the servers.

SUMMARY

The invention provides a server system, a server device and a power recovery method therefor, capable of achieving a power supply recovery function by mutually connected direct-current (DC) power supplies to reduce construction cost and weight of servers and increase AC-to-DC power conversion efficiency.

According to an embodiment of the disclosure, a server system including a plurality of servers and a power controller is provided. Each of the servers includes an alternating-current (AC) power supply and a DC power supply. The AC power supply is configured to receive an external AC power and convert the external AC power into a power of each of the servers. The DC power supplies of the servers are mutually connected through a cable. The power controller communicates with the servers. When a specific server detects that an AC power supply belonging thereto does not operate normally, the power controller informs other servers of a power required by the specific server, and the specific server controls the DC power supply belonging thereto to obtain powers provided from other servers through the cable, thereby maintaining operation of the specific server.

According to an embodiment of the disclosure, a server device including an AC power supply, a DC power supply and a server main board is provided. The AC power supply is configured to receive an external AC power and convert the external AC power into a power of the server device. The DC power supply is connected with DC power supplies of other servers through a cable. The server main board includes a server processor. The server processor is coupled to the AC power supply and the DC power supply. The server processor detects whether the AC power supply operates normally. When detecting that the AC power supply does not operate normally, the server processor informs other servers of a power required by the server main board and controls the DC power supply to obtain the powers provided from other servers through the cable, thereby maintaining operation of the server main board.

According to an embodiment of the disclosure, a power recovery method for a server system is provided. The server system includes a plurality of servers, each of the servers includes an AC power supply and a DC power supply, and the DC power supplies of the servers are mutually connected through a cable. The power recovery method includes the following steps: obtaining redundant power supply volumes corresponding to the servers; when an AC power supply belonging to a specific server does not operate normally, informing other servers of a power required by the specific server; and, controlling the DC power supply belonging to the specific server to obtain the powers provided from other servers through the cable, thereby maintaining operation of the specific server. Other servers provide the powers to the DC power supply of the specific server according to the redundant power supply volumes corresponding to other servers through the cable.

To sum up, in the server system, the server device and the power recovery method therefor provided according to the embodiments of the disclosure, a single AC power supply and a single DC power supply are disposed in each server, the DC power supplies of the servers are connected with one another through the cable. The power controller can collect the power-consumption wattage of each server main board and the power-supply wattage of the AC power supply belong thereto, thereby obtaining the redundant power supply volume of each of the servers. In this way, when the AC power supply of one of the servers does not operate normally (which is damaged and fails to provide the power, for example), the power controller can immediately distribute the power according to the redundant power supply volumes corresponding to other servers and inform these servers, while the server whose AC power supply does not operate normally can obtain the required power through the cable among the DC power supplies. Thereby, the embodiments of the disclosure can achieve the power supply recovery function by the mutually connected DC power supplies to reduce construction cost and weight of the servers and increase AC-to-DC power conversion efficiency.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
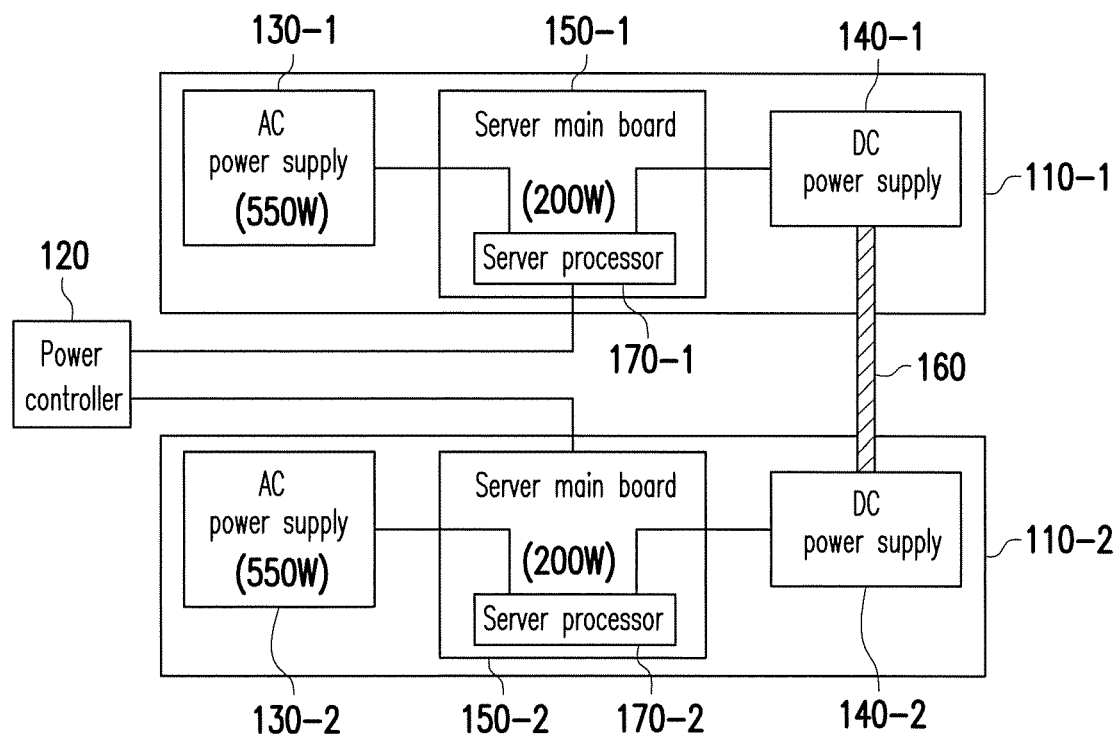
FIG. 1 is a functional block diagram illustrating a server system according to an embodiment of the disclosure.

FIG. 1 is a functional block diagram illustrating a server system 100 according to an embodiment of the disclosure. The server system 100 illustrated in FIG. 1 includes a plurality of servers (e.g., two servers 110-1 and 110-2) and a power controller 120. The servers may also be referred to as server devices. In the present embodiment, the power controller 120 may be a cabinet controller of a cabinet where both the servers 110-1 and 110-2 are located, which is also the so-called "centralized cabinet management". In accordance with other embodiments of the disclosure, the power controller 120 may also belong to one selected from the servers 110-1 and 110-2 and employed for power supply management of the cabinet. Namely, both the servers 110-1 and 110-2 are in charge of partial power supply management of the cabinet, which is also the so-called "distributed cabinet management". In the present embodiment, server main boards 150-1 and 150-2 and the power controller 120 are first connected to a network switch, such that the server main boards 150-1 and 150-2 communicate with the power controller 120 through a network interface of the network switch. In other words, the network switch connects all devices (e.g., the servers 110-1 and 110-2 and the power controller 120) connected thereto through the network interface and induce the devices to transmit information to each other. In accordance with other embodiments of the disclosure, the servers 110-1 and 110-2 may be connected with the power controller 120 through a dedicated data bus for communication and information transmission between each other. The servers 110-1 and 110-2 may be computing hosts or storage hosts in a data center.

It is to be specially noted that each of the servers of the present embodiment at least includes an AC power supply and a DC power supply, and the DC power supplies are connected with each other. To be detailed, referring to FIG. 1, the server 110-1 includes an AC power supply 130-1, a DC power supply 140-1 and a server main board 150-1, and the server 110-2 includes an AC power supply 130-2, a DC power supply 140-2 and a server main board 150-2. The server main boards 150-1 and 150-2 respectively include server processors 170-1 and 170-2. The server processors 170-1 and 170-2 are respectively coupled to the AC power supplies 130-1 and 130-2 and the DC power supplies 140-1 and 140-2. Each of the AC power supplies 130-1 and 130-2 is configured to receive an external AC power and convert the external AC power into powers/electric power/electricity required by the server main boards 150-1 and 150-2 of the servers 110-1 and 110-2. The DC power supplies 140-1 and 140-2 of the servers 110-1 and 110-2 are connected with each other through a cable 160.

In another embodiment of the disclosure, the cable 160 may also be equipped with a bus function. In other words, the cable 160 is capable of not only transmitting DC power but also allowing the DC power supplies 140-1 and 140-2 to communicate with each other. Circuit structures of the AC power supplies 130-1 and 130-2 are more complicated than those of the DC power supplies 140-1 and 140-2, and the AC power supplies 130-1 and 130-2 include rectifiers, which are heavier and large-volume, to convert an AC power into a DC power. Thus, in the embodiments of the disclosure, each server is disposed with the DC power supply mutually connected with the DC power supplies of other servers through the cable rather than disposed with another AC power supply for backup, thereby achieving the power supply recovery function by a power recovery method of an embodiment of the disclosure.

In the example illustrated in FIG. 1, each of the AC power supplies 130-1 and 130-2 may provide a power supply volume of 550 W, and a power-consumption wattage of the server main boards 150-1 and 150-2 is 200 W. The power supply volume or the power-consumption wattage may be arbitrarily adjusted by those who apply the present embodiment, as long as the power supply volume of the AC power supply is more than the power-consumption wattage of the server main board in each server, and the power supply volume of the AC power supply of each server is different from the power-consumption wattage of the server main board based on demands. As only two servers 110-1 and 110-2 are provided in the server system 100 in the example illustrated in FIG. 1, in order to allow each of the AC power supplies 130-1 and 130-2 to simultaneously carry the server main board in another server, an AC power supply of 550 W more than 400 W (i.e., 200 W*2) is selected to apply in the embodiment of the disclosure, such that the AC power supply is equipped with an redundant power supply volume for supporting other servers, thereby carrying out the embodiment of the disclosure. If more servers (e.g., three servers or more) are provided in the server system, an AC power supply with a wattage less than 550 W may also be used, such that the AC power supply in each server may share the burden of power supply recovery more averagely.

Figure 2:
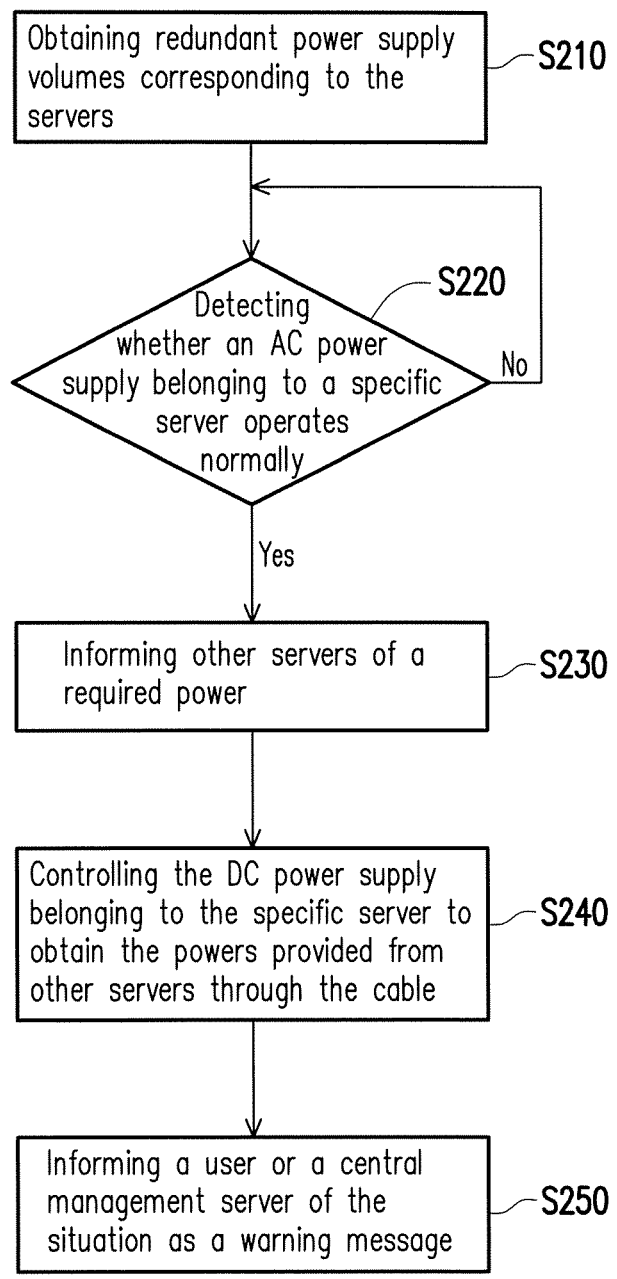
FIG. 2 is a flowchart illustrating a power recovery method for a server system according to an embodiment of the disclosure.

FIG. 2 is a flowchart illustrating a power recovery method for a server system according to an embodiment of the disclosure. The power recovery method illustrated in FIG. 2 may be applied to the server system 100 illustrated in FIG. 1. Referring to both FIG. 1 and FIG. 2, in step S210, the power controller 120 obtains a redundant power supply volume corresponding to each of the servers 110-1 and 110-2. Specifically, the power controller 120 may obtain a power-supply wattage (e.g., 550 W) of each of the AC power supplies 130-1 and 130-2 and a power-consumption wattage of each of the servers 110-1 and 110-2 (e.g., each of the server main boards 150-1 and 150-2 has a power-consumption wattage of 200 W) from each of the servers 110-1 and 110-2, thereby, obtaining a redundant power supply volume (e.g., 550 W−200 W=350 W) corresponding to each of the servers 110-1 and 110-2.

In step S220, the power controller 120 may detect whether each of the AC power supplies 130-1 and 130-2 in each of the servers 130-1 and 130-2 operates normally by various manners. In some embodiments, the power controller 120 may determine whether each of the AC power supplies 130-1 and 130-2 operates normally directly through a power good signal (PG) periodically provided by each of the AC power supplies 130-1 and 130-2. Alternatively, the power controller 120 may learn whether any one of the AC power supplies 130-1 and 130-2 does not operate normally indirectly by being informed by the server processor 170-1 or 170-2. If each of the AC power supplies 130-1 and 130-2 operates normally, the power controller 120 repeatedly performs step S220 to maintain normal operation of the power supply recovery function.

By contrast, if the AC power supply 130-1 of certain one of the servers (which is referred to as a specific server, and the server 110-1 is taken as an example in this case) does not operate normally (which is damaged and fails to provide the power, for example), the method enters step S230 from step S220, where the server processor 170-1 informs the power controller 120 that an abnormal situation occurs to the power, the power controller 120 informs another server (e.g., the server 110-2) and simultaneously informs another server (e.g., the server 110-2) that a power/electric power/electricity required by the server main board 150-1 in the specific server 110-1 is 200 W, while the required power, 200 W, is not more than a redundant power supply volume, 350 W, corresponding to the server 110-2. Thus, in step S240, the server processor 170-1 in the specific server 170-1 controls the DC power supply 140-1 belonging thereto to obtain the power provided from the server 110-2 through the cable 160, thereby, maintaining the operation of the specific server 110-1 (especially, the operation of the server main board 150-1 in the server 110-1). On the other hand, the server 110-2 provides the power to the DC power supply 140-1 of the specific server 110-1 through the cable 160 according to the redundant power supply volume (350 W). In other words, the server 110-2 may transmit the redundant power supply volume of 350 W of the AC power supply 130-2 to the DC power supply 140-1 of the specific server 110-1 through the DC power supply 140-2 and the cable 160.

When the power supply recovery function of step S230 to step S240 is completed, the method proceeds to step S250, where the power controller 120 determines a situation that the AC power supply 130-1 in the specific server 110-1 does not operate normally as a warning message to inform a user or a central management server, such that the user or an administrator in a data center may solve the situation as soon as possible.

Comparatively, in the conventional technique, if each of the servers is disposed with two AC power supplies, a power-consumption wattage of the server main board of each of the servers is 200 W, and a power-supply wattage of the DC power supply is 250 W, a value of power conversion loss is about 35.8 W, which is calculated by multiplying 200 W by 0.0895 (which is a normal power consumption parameter of an AC power supply) by 2 (which indicates two servers in this case). By contrast, in a scenario that the server system 100 illustrated in FIG. 1 operates normally, as the DC power supply has a lower normal power consumption parameter, a value of power conversion loss is about 28 W, which is calculated by multiplying 200 W by 0.07 (which is a normal power consumption parameter of a DC power supply) by 2 (which indicates two servers in this case). In this way, it can be seen that the server system 100 of the embodiment of the disclosure may achieve a reduction of the power conversion loss to about 7.8 W (i.e., 35.8 W−28 W), i.e., an increase of AC-to-DC conversion efficiency to about 21.7% (i.e., 7.8 W/35.8 W).

Figure 3:
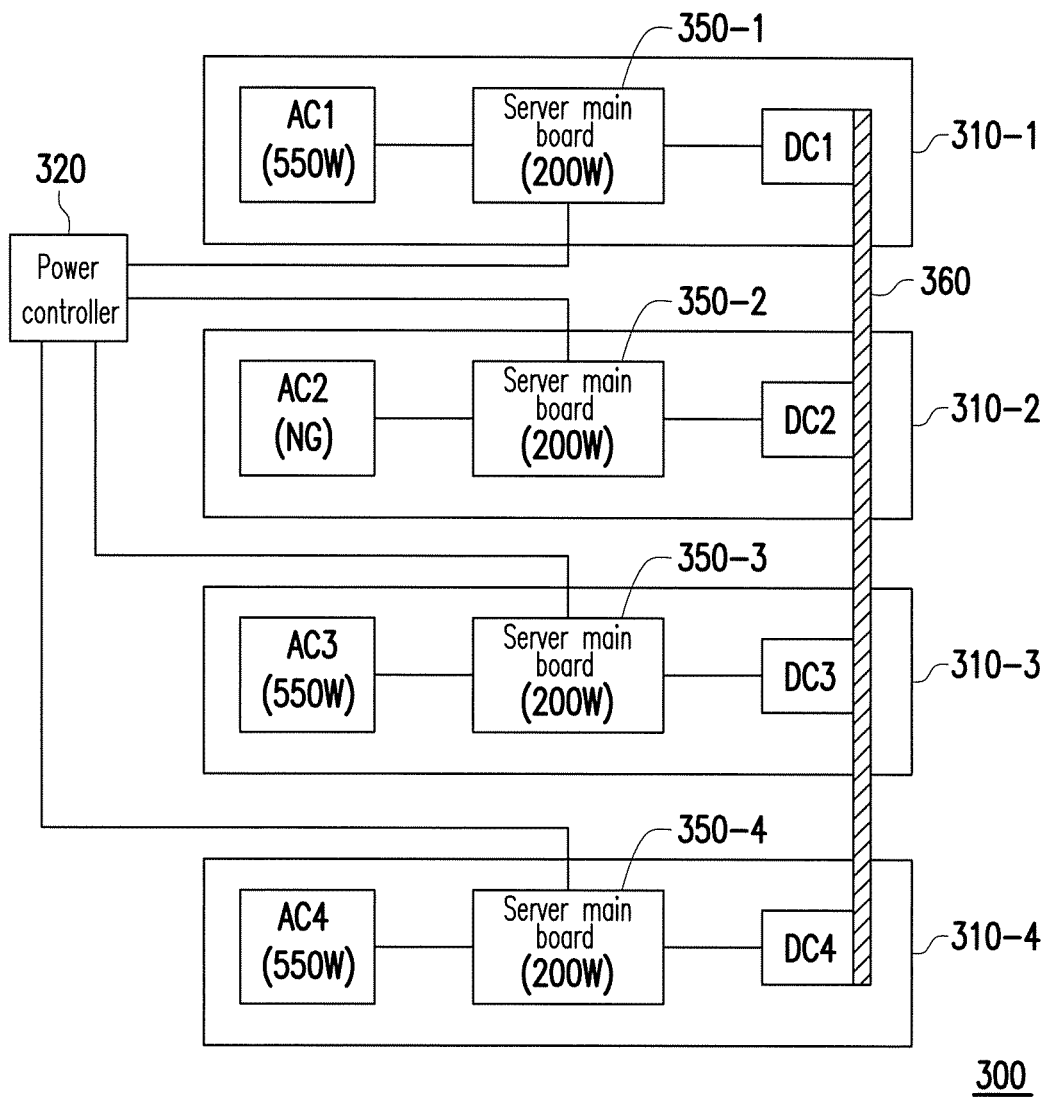
FIG. 3 is a functional block diagram illustrating a server system according to another embodiment of the disclosure.

FIG. 3 is a functional block diagram illustrating a server system 300 according to another embodiment of the disclosure. The difference between the server 100 illustrated in FIG. 1 and the server 300 illustrated in FIG. 3 mainly lies in the server 300 illustrated in FIG. 3 including 4 servers 310-1 to 310-4 as an example for illustrating the embodiment of the disclosure. The server system 300 includes a plurality of servers 310-1 to 310-4 and a power controller 320. The servers 310-1 to 310-4 respectively include AC power supplies AC1 to AC4, DC power supplies DC1 to DC4 and server main boards 350-1 to 350-4. The DC power supply DC1 to DC4 are connected with one another through a cable 360. For descriptive convenience, a server processor is omitted from each of the server main boards 350-1 to 350-4 illustrated in FIG. 3, a power-supply wattage of each of the AC power supplies AC1 to AC4 is set to 550 W, and a power-consumption wattage of each of the server main boards 350-1 to 350-4 is set to 200 W.

Referring to both FIG. 2 and FIG. 3, in step S210, the power controller 320 obtains a redundant power supply volume corresponding to each of the servers 310-1 to 310-4, which is 350 W (i.e., 550 W−200 W). In step S220, whether each of the AC power supplies AC1 to AC4 operates normally is detected. It is assumed herein that the AC power supply AC2 in a specific server 310-2 does not operate normally/works abnormally (which is marked by NG). When it is detected that the AC power supply AC2 does not operate normally, the method enters step S230 and step S240 from step S220, and the power controller 320 informs the other servers 310-1 and 310-3 to 310-4 that a power/electric power/electricity required by the specific server 310-2 is 200 W. Alternatively, in order to increase additional power consumption of the server 310-2, the required power may be adaptively increased, for example, to 220 W. In this case, a power supply volumes of each of the AC power supplies AC1 and AC3 to AC4 of each of the servers 310-1 and 310-3 to 310-4 may be increased to 295 W, such that the wattage 885 W, which is calculated by 295 W multiplied by 3, is greater than a power-consumption wattage of 880 W (i.e., 220 W*4) required by the server main boards 350-1 to 350-4 of the 4 servers 310-1 to 310-4. Additionally, in step S250, the power controller 320 informs the user or the central management server of the situation that the AC power supply AC2 in the specific server 310-2 does not operate normally as a warning message, such that the user or the administrator in the data center may solve the situation as soon as possible.

Based on the above, in the server system, the server device and the power recovery method therefor provided according to the embodiments of the disclosure, a single AC power supply and a single DC power supply are disposed in each server, and the DC power supplies of the servers are connected with one another through the cable. The power controller can collect the power-consumption wattage of each server main board and the power-supply wattage of the AC power supply belonging thereto, thereby obtaining the redundant power supply volume of each server. In this way, when the AC power supply of one of the servers does not operate normally (which is damaged and fails to provide the power, for example), the power controller can immediately distribute the power according to the redundant power supply volumes corresponding to other servers and inform these servers, while the server whose AC power supply does not operate normally can obtain the required power through the cable among the DC power supplies. Thereby, the embodiments of the disclosure can achieve the power supply recovery function by the mutually connected DC power supplies to reduce construction cost and weight of the servers and increase AC-to-DC power conversion efficiency.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A server system, comprising:
   a plurality of servers, each of the servers comprising:
      a single alternating-current (AC) power supply, configured to receive an external AC power and convert the external AC power into a power of each of the servers, wherein each of the servers comprises only the single AC power supply and does not comprise another AC power supply; and
      a direct-current (DC) power supply, for obtaining redundant power provided by the single AC power supply to each of the servers, and the DC power supply of each of the servers being mutually connected through a cable; and
   a power controller, communicating with the servers, wherein the power controller obtains a power-supply wattage of the single AC power supply of each of the servers and a power-consumption wattage of each of the servers, thereby obtaining a redundant power supply volume of the single AC power supply of each of the servers,
   wherein the power controller informs other servers of a power required by a specific server in response to detecting that a single AC power supply of the specific server does not operate normally and controls the other servers to provide the powers to the specific server according to the redundant power supply volumes of the other servers through the cable, and the specific server controls the DC power supply belonging thereto to obtain powers provided from other servers through the cable, thereby maintaining operation of the specific server.

2. The server system according to claim 1, wherein the servers are computing hosts or storage hosts.

3. The server system according to claim 1, wherein the power controller belongs to one of the servers or is a cabinet controller of a cabinet wherein the servers are located.

4. A server device, comprising:
   a single AC power supply, configured to receive an external AC power and convert the external AC power into a power of the server device wherein the server comprises only the single AC power supply and does not comprise another AC power supply;
   a DC power supply, for obtaining redundant power provided by the single AC power supply to other servers, and connected with DC power supplies of other servers through a cable; and
   a server main board, comprising a server processor coupled to the single AC power supply and the DC power supply, wherein
   the server processor detects whether the single AC power supply operates normally, and
   when detecting that the single AC power supply does not operate normally, the server processor informs other servers of a power required by the server main board and controls the DC power supply to obtain the powers provided from other servers through the cable, and the other servers provides the powers to the server device according to redundant power supply volumes of the other servers, thereby maintaining operation of the server main board, wherein each of the other servers comprises only one single AC power supply and does not comprise another AC power supply, and each of the redundant power supply volumes of single AC power supplies of the other servers is associated one of power-supply wattages of the single AC power supplies of the other servers and one of power-consumption wattages of the other servers.

5. The server device according to claim 4, wherein the server device is a computing host or a storage host.

6. The server device according to claim 4, wherein the server processor informs other servers of the power required by the server main board with a power controller.

7. The server device according to claim 6, wherein the power controller belongs to one of the servers or is a cabinet controller of a cabinet wherein the servers are located.

8. A power recovery method for a server system, wherein the server system comprises a plurality of servers, each of the servers comprises a single AC power supply and a DC power supply, and each of the servers comprises only the single AC power supply and does not comprise another AC power supply, and the DC power supplies of the servers are configured for obtaining redundant power provided by the single AC power supply to each of the servers and mutually connected through a cable, the power recovery method comprising:
   obtaining a power-supply wattage of the single AC power supply and a power-consumption wattage of each of the servers from each of the servers to obtain redundant power supply volumes corresponding to the servers;
   when the single AC power supply belonging to a specific server does not operate normally, informing other servers of a power required by the specific server, wherein the power is not more than the redundant power supply volumes corresponding to other servers; and
   controlling the DC power supply belonging to the specific server to obtain the powers provided from other servers through the cable, thereby maintaining operation of the specific server, wherein other servers provide the powers to the DC power supply of the specific server according to the redundant power supply volumes corresponding to other servers through the cable.

* * * * *